(12) United States Patent
Gross

(10) Patent No.: US 10,077,870 B2
(45) Date of Patent: Sep. 18, 2018

(54) NUISANCE MARINE GROWTH PREVENTING COMPOUND AND VALVE SYSTEM

(71) Applicant: Donald Gross, Stevensville, MD (US)

(72) Inventor: Donald Gross, Stevensville, MD (US)

(*) Notice: Subject to any disclaimer, the term of this patent is extended or adjusted under 35 U.S.C. 154(b) by 153 days.

(21) Appl. No.: 14/851,246

(22) Filed: Sep. 11, 2015

(65) Prior Publication Data
US 2017/0074409 A1    Mar. 16, 2017

(51) Int. Cl.
| | |
|---|---|
| *F16K 5/22* | (2006.01) |
| *C10M 125/24* | (2006.01) |
| *F16N 1/00* | (2006.01) |
| *F16N 21/02* | (2006.01) |
| *F16K 3/22* | (2006.01) |
| *C10M 159/02* | (2006.01) |
| *C10M 169/06* | (2006.01) |

(52) U.S. Cl.
CPC ........... *F16N 21/02* (2013.01); *C10M 125/24* (2013.01); *C10M 159/02* (2013.01); *C10M 169/06* (2013.01); *F16K 3/22* (2013.01); *F16K 5/227* (2013.01); *F16N 1/00* (2013.01); *C10M 2201/085* (2013.01); *C10M 2207/401* (2013.01); *C10N 2230/06* (2013.01); *C10N 2240/00* (2013.01); *C10N 2250/10* (2013.01)

(58) Field of Classification Search
CPC ... F16K 3/36; F16K 3/22; F16K 5/227; F16N 21/02; F16N 1/00; C10M 125/24; C10M 2223/02; C10N 2250/10; C10N 2230/50
USPC ........................................ 251/315.01–315.16
See application file for complete search history.

(56) References Cited

U.S. PATENT DOCUMENTS

| | | | |
|---|---|---|---|
| 4,304,252 A * | 12/1981 | Stanton | F16K 5/0605 137/123 |
| 4,675,051 A | 6/1987 | Baxter | |
| 5,123,369 A | 6/1992 | Gross | |
| 6,209,472 B1 | 4/2001 | Staerzl | |
| 6,669,171 B1 * | 12/2003 | Stunkard | F16K 5/0673 251/315.08 |
| 2005/0058689 A1 | 3/2005 | McDaniel | |
| 2008/0175812 A1 | 7/2008 | Seabrook et al. | |
| 2010/0248334 A1 | 9/2010 | McDaniel | |
| 2011/0111995 A1* | 5/2011 | Akita | B23K 35/3612 508/451 |
| 2014/0037704 A1 | 2/2014 | Carlson et al. | |

FOREIGN PATENT DOCUMENTS

WO    2012/139172    10/2012

* cited by examiner

*Primary Examiner* — Marina Tietjen
(74) *Attorney, Agent, or Firm* — Rankin, Hill & Clark LLP

(57) ABSTRACT

To prevent nuisance marine growth in a valve, particularly a ball valve, used to regulate a flow of seawater, a compound for lubricating and preventing nuisance marine growth is provided in the valve. The nuisance marine growth preventing compound includes a substantially uniform mixture of marine grease and an antifouling agent. The compound is introduced into the valve such that the compound is provided between and contacts a valve body and a ball that regulates the flow of seawater within the valve, and inhibits nuisance marine growth at a space between the ball and the valve body which is occupied by the compound.

17 Claims, 2 Drawing Sheets

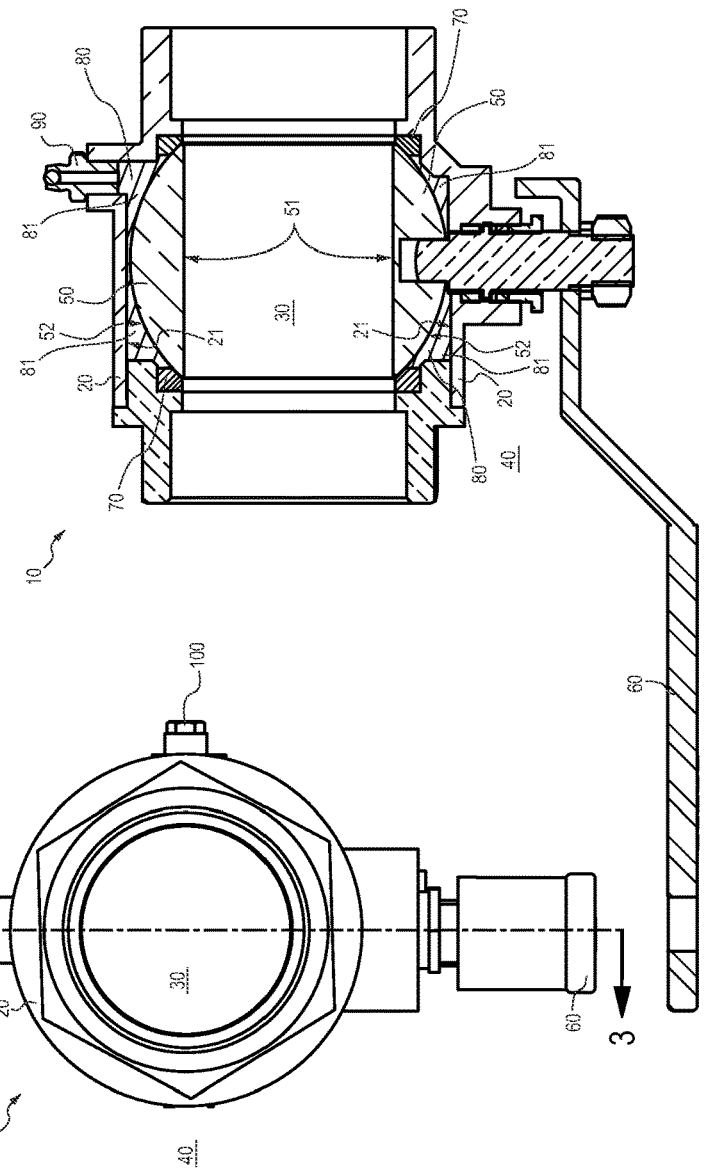
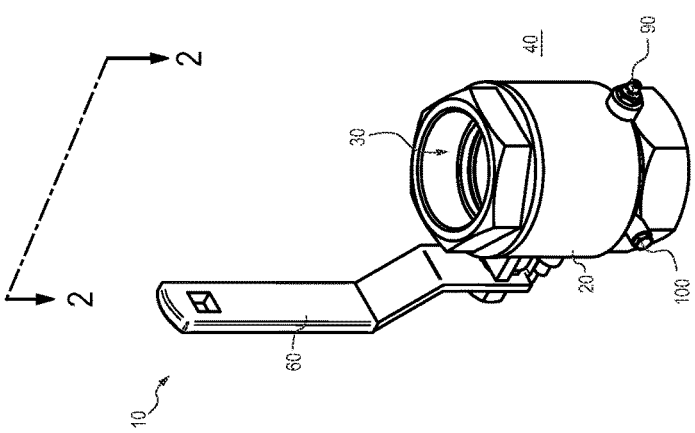

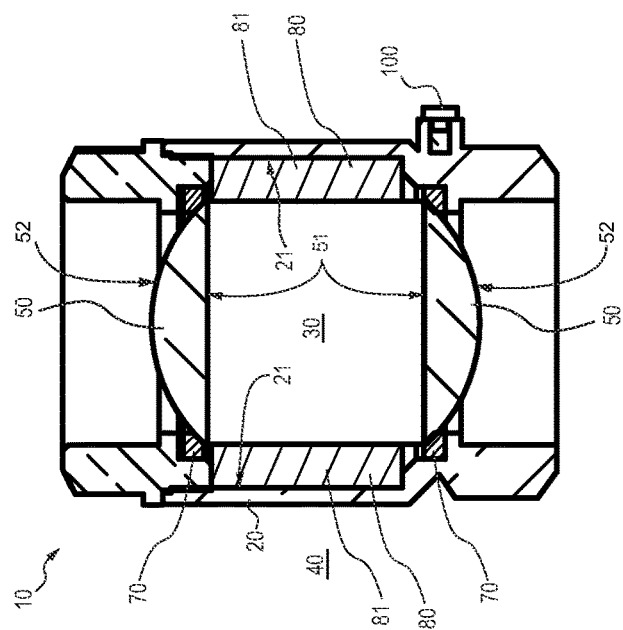
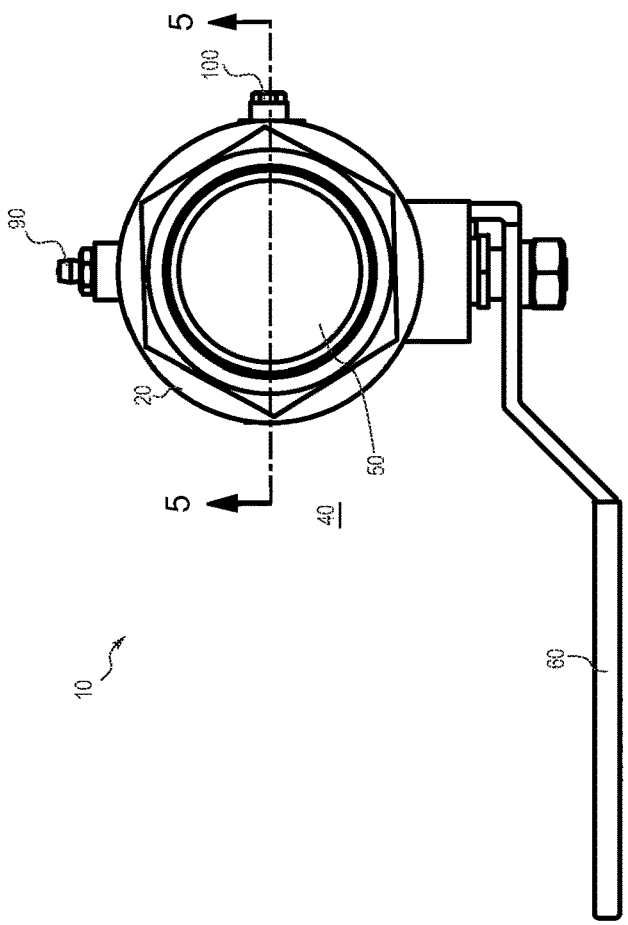

NUISANCE MARINE GROWTH PREVENTING COMPOUND AND VALVE SYSTEM

BACKGROUND

It is common for marine crafts to use one or more valves to regulate the flow of seawater through various fluid systems within the crafts. One type of fluid system is an internal engine cooling system, wherein seawater from the exterior of the craft is pumped through the cooling system to cool the engine. A type of valve typically used in these systems is a ball valve, which includes a ball seated on seat rings within a valve body and operable (via rotation) to regulate the flow of seawater through the valve. A seacock is a type of ball valve that includes a flange for securing to the hull of the craft and is typically used in marine applications.

When using ball valves in marine applications, seawater penetrates the interior of the valve between a ball and a valve body when the valve is moved from an opened position to a closed position. This occurs because the cylindrical passage (i.e. bore) through the valve ball is filled with water when the valve is open. When the valve ball rotates 90° to the closed position, water that is present in the cylindrical passage is deposited in the space between the ball, seats, and valve body.

Additionally, when the seawater is allowed to remain in the space between the ball and the valve body, nuisance marine growth (i.e. biological and non-living fouling material) can accumulate on the outer surface of the ball, the inner surface of the valve body, and on seat rings. The buildup of the nuisance marine growth makes it more difficult to operate the valve between open and closed positions (i.e., to rotate the ball) and possibly degrades the seal formed by the seat rings between the ball and the valve body.

To prevent freezing in winter, typical marine ball valves include one or more drains and corresponding drain plugs, which can be periodically opened to drain the seawater from the space between the ball and the valve body. However, these drain plugs must be manually operated and sea craft owners are prone to forget to drain the valves, thus allowing seawater to remain inside the valve for extended periods of time and allowing the buildup of fouling material, thus compromising efficient valve operation. Furthermore, even when drained, some seawater may remain trapped between the ball and the valve body, so that nuisance marine growth may still develop in this area.

SUMMARY

The present application is directed to a method, a valve system, and a compound that prevents nuisance marine growth. According to one aspect, a method is provided for lubricating and preventing marine growth in a valve used to regulate a flow of seawater. The valve includes a valve body defining an interior and an exterior of the valve, a ball positioned in the interior of the valve to regulate the flow of seawater through the valve body, and a drain port between the interior and the exterior of the valve. The method includes providing a compound including a mixture of a marine grease and an antifouling agent, and introducing the compound to the interior of the valve through the drain port such that the compound is provided between and contacts the ball and the valve body. In one embodiment, the valve may include seat rings, which along with the ball may be in contact with the compound. In another embodiment, the valve may include a drain port equipped with a zerk fitting, through which the compound is introduced to the interior of the valve.

According to another aspect, a valve system for regulating the flow of seawater is provided with a valve and a compound. The valve includes a valve body and a ball. The valve body defines an interior and an exterior of the valve. The ball is positioned in the interior of the valve and is configured to regulate a flow of seawater through the valve body. The compound is provided in the interior of the valve between and in contact with the ball and the valve body. The compound is a substantially uniform mixture of marine grease and an antifouling agent. The compound prevents the seawater from entering an area between the ball and the valve body at which the compound is provided. In one embodiment, the compound may fill the area between the ball and the valve body. In another embodiment, the valve may include a drain port equipped with a zerk fitting, through which the compound may be introduced to the interior of the valve.

According to yet another aspect, a compound is provided for lubricating and preventing nuisance marine growth in a marine ball valve through which a flow of seawater is regulated. The compound includes a substantially uniform mixture of marine grease and an antifouling agent. In the antifouling agent, nuisance marine growth has a solubility of more than about 0.1 g/100 mL at 20° C.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings. It is to be appreciated that the subject matter described herein is capable of other and different embodiments, and its several details are capable of modifications in various respects, all without departing from the scope of the instant disclosure. Accordingly, the drawings and description are to be regarded as illustrative and not restrictive.

FIG. 1 is a perspective view of a ball valve system in an open position in accordance with the present application.

FIG. 2 is a schematic end view taken along line 2-2 of the ball valve system of FIG. 1.

FIG. 3 is a schematic cross-sectional view taken along line 3-3 of the ball valve system of FIG. 2.

FIG. 4 is a schematic end view taken along line 2-2 of the ball valve system of FIG. 1 in a closed position.

FIG. 5 is a schematic cross-sectional view taken along line 5-5 of the ball valve system of FIG. 4.

DETAILED DESCRIPTION

The compounds, methods and systems described herein address fouling due to nuisance marine growth inside valves, particularly ball valves, that are used to regulate the flow of seawater. Nuisance marine growth in these valves can be prevented or inhibited by introducing a nuisance marine growth preventing compound to the interior of the valves. Although generally described in relation to a ball valve, the present subject matter is not limited to the use of a ball valve and can incorporate the use of other types of valves including tapered plug valves, choke valves, or gate valves, for example. Furthermore, the invention pertains to all types of ball valves, whether or not they are used to regulate the flow of sea water.

As used herein, seawater includes both fresh and salt water, and nuisance marine growth includes biofouling and non-living fouling. Biofouling can include for example, zebra muscles, algae, and barnacles. Non-living fouling can include scaling or precipitation fouling, which includes mineral deposits from calcium and magnesium-containing minerals such as limestone, chalk and dolomite and composed mainly of calcium carbonate ($CaCO_3$) or bicarbonate, magnesium hydroxide ($Mg(OH)_2$), calcium sulfate ($CaSO_4$) and others.

A valve system, including the valve and nuisance marine growth preventing compound, can be used in a fluid system of a marine craft or in any other system for regulating the flow of seawater. The nuisance marine growth preventing compound can be introduced to the interior of the ball valve in the space between the ball and the valve body, or to the interior of other types of valves between a valve ball used to regulate the flow of seawater and a valve body. The valve may include a grease fitting, also known as a zerk fitting, for introducing the compound to the interior of the valve.

The compound includes a mixture of a heavy, water-resistant grease (i.e., a marine grease) and an antifouling agent. The marine grease is included to lubricate the valve (e.g., the ball) when the valve is used to regulate the flow of seawater, as well as to provide a base that is sufficiently viscous to hold the compound in a position at which the prevention of nuisance marine growth is desired (e.g., between the ball and the valve body). The compound can fill up the space between the ball and the valve body to exclude water from entering the space. If however, water is able to penetrate the space between the ball and the valve body, then the antifouling agent prevents nuisance marine growth by dissolving the nuisance marine growth. Furthermore, the antifouling agent of the compound can also dissolve nuisance marine growth in the vicinity of the space.

The nuisance marine growth preventing compound includes the grease and antifouling agent at a volumetric ratio from about 4:1 to about 6:1, or at a ratio of about 5:1. This ratio may be determined based on a desired viscosity of the resulting nuisance marine growth preventing compound. Particularly, the ratio can be set so that the nuisance marine growth preventing compound has a sufficiently high viscosity in order to provide adequate lubrication and water resistance in the valve, and to resist water wash out.

The nuisance marine growth preventing compound may be prepared by simply combining and mechanically mixing the marine grease and antifouling agent, optionally at an elevated temperature above room temperature (i.e. above 23° C.). The marine grease and antifouling agent may be mixed to form a substantially uniform mixture with a substantially uniform distribution of components throughout the mixture.

With respect to the marine grease, it is noted that grease is thixotropic, wherein it has a high initial viscosity, but upon shear the viscosity of the grease drops close to that of the base oil. Grease is used for lubricating component parts in situations wherein it is important to keep the base oil on the component part, rather than running off the part such as may be the case where only oil is applied to the part. The type of grease used in the compound of the present application is not particularly limited by the present subject matter, and includes a thickener (i.e. complex) emulsified with oil (i.e. base oil).

As noted above, suitable greases for use in the nuisance marine growth preventing compound of the present application include marine greases. A marine grease is a grease specifically formulated to resist degradation upon exposure to water, such as resisting water washout as determined by ASTM D1264-12, which estimates the resistance of greases to water washout by determining what percentage of grease is lost by performing a predefined test. In one embodiment, the marine grease used in the present subject matter has a water washout of less than 10%, less than 7.5%, or less than 5% of grease that is washed away when tested by ASTM D1264-12, or about 0.1-10%, 0.5-7.5%, or 1-5% of grease that is washed away.

The marine grease can comprise about 65-98% of a base oil, about 2-20% of a thickener (e.g. a soap), and about 0-15% of optional additives including a tackifier.

The marine grease may include a base oil with a viscosity index of about 50-120, and kenematic viscosity at 40° C. of about 150-310 centistokes (cSt) or $mm^2/s$ as measured by ASTM D445. The base oil may be a mineral oil (paraffinic or naphthenic), synthetic oil (PAO, ester, PAG, alkylbenzenes), natural oil (vegetable oils), or high performance oil (silicones, fluorinated fluids).

The base oil component can include one or more blended base oils, which may comply with the requirements for base oils as categorized in Groups I-V as defined by the American Petroleum Institute (API), as shown below in Table 1.

TABLE 1

API Base Oil Categories

| Group | Saturated hydrocarbons (wt %) | Sulfur (wt %) | Viscosity index |
|---|---|---|---|
| I | <90 and/or | >0.03 | 80 to 120 |
| II | >90 | <0.03 | 80 to 120 |
| III | >90 | <0.03 | >120 |
| IV | Polyalphaolefins (PAO) Synthetic Lubricants | | |
| V | All other base oils not belonging to Groups I-IV | | |

The Group I base oils include paraffinic mineral oils obtained by, for example, applying a suitable combination of purification means such as solvent refining, hydro-refining and dewaxing, etc., to the lubricating oil fraction obtained by the atmospheric distillation of crude oil. Group II base oils include paraffinic mineral oils obtained by, for example, applying a suitable combination of purification means such as hydro-cracking and dewaxing, etc., to the lubricating oil fraction obtained by the atmospheric distillation of crude oil. The Group II base oils produced by a hydro-refining method such as the Gulf Co. method have a total sulphur component content of less than 10 ppm and an aromatics content of no more than 5%.

Oils of Group III are base oils with very high viscosity indices (VHVI) produced by modern methods from crude oil by hydrocracking, followed by isomerization of the waxy linear paraffins to give branched paraffins. Oils of Group III also include base oils produced from Slack Wax (SW) paraffins from mineral oils.

Oils of Group IV are synthetic polyalphaolefins (PAO). Examples of the synthetic oils include polyolefins, the diesters of dibasic acids like dioctyl sebacate, polyol esters, alkylbenzenes, alkylnaphthalenes, esters, polyoxyalkylene glycols, polyoxyalkylene glycol esters, polyoxyalkylene glycol ethers, polyphenyl ethers, dialkyl diphenyl ethers, fluorine-containing compounds (perfluoropolyethers, fluorinated polyolefins and the like), and silicones, etc.

Ester base oils belonging in Group V are produced from fatty acids and alcohols. Said fatty acids are either natural or synthetic mono or dicarboxylic acids. Depending on the ester to be produced, the alcohol is a polyol or a monohydroxylic alcohol. Ester base oils are typically monoesters, diesters, polyol esters or dimer esters.

In addition to the official classification, Group II+ is commonly used in this field. This group includes saturated and sulfur-free base oils having viscosity indices of more than 110, but below 120. In these classifications saturated hydrocarbons include paraffinic and naphthenic compounds, but not aromatics.

Base oil is the base stock or blend of base stocks used in API-licensed oil. The base stock types are 1) mineral oil (paraffinic, naphthenic, aromatic), 2) synthetic (polyalphaolefins, alkylated aromatics, diesters, polyol esters, polyalkylene glycols, phosphate esters, silicones), 3) plant oil, and 4) high performance oil.

In one embodiment, the base oil comprises a petroleum distillate, including for example a solvent-refined heavy paraffinic petroleum distillate. Other petroleum distillate products can be used.

The thickener component is not particularly restricted, and it may be of the kinds employed in conventional grease compositions. The thickener can include a soap base thickener, a non-soap thickener, and combinations thereof. Soap base thickeners including lithium, lithium 12-hydrosysterate, lithium complex, sodium, calcium, calcium 12-hydroxysterate, overbased calcium sulfonate complex, calcium complex, barium, barium complex, aluminum complex for example, can be used. Non-soap thickeners including clay (bentonite), polyuria, and others and mixtures of these can also be used. In one embodiment, the thickener is a lithium complex.

Optional additives can include, for example, one or more of antioxidants (inhibit oxidation of base oil), rust inhibitors (inhibits rusting of coated components), antiwear additives (provides wear protection during boundary lubrication), extreme pressure (EP) additives (provides protection during high load and shock loading conditions), tackifiers (polymers that enhance water resistance and metal adhesiveness of the grease), and molybdenum or disulfide/graphite solid lubricants (provide protection and friction reduction under high load/sliding conditions at low speeds).

Suitable marine greases for use in the compound of the present application include, for example, Castrol Multipurpose Marine Grease #2 and the Spheerol EPL and SX ranges of greases provided by BP Lubricants USA Inc., 1500 Valley Rd., Wayne, N.J., 07470 United States; Lucas Marine Grease NLGI #2 GC-LB provided by Lucas Oil Products, Inc., 302 N. Sheridan St., Corona, Calif., 92880 United States; MAG 1 MP Marine Grease provided by Warren Distribution, Inc., 727 S 13th St., Omaha, Nebr., 68102 United States; Amosil Synthetic Water-Resistant Grease NGLI #2 provided by Amosil Inc., 925 Tower Ave., Superior, Wis. 54880 United States; and Maxima Waterproof Grease available from Maxima Racing Oils, 9266 Abraham Way. Santee, Calif. 92071, United States.

With respect to the antifouling agent, it is noted that the antifouling agent is not particularly limited, and can include various molluscicides, algicides, fungicides, antiprotozoals, antiparasites, and antimicrobials. In accordance with the present subject matter, the antifouling agent can include mineral acids, sulfonic acids, or carboxylic acids; for example phosphoric acid, hydrochloric acid, phthalic acid, acetic acid, peracetic acid, oxalic acid, muriatic acid, and others, and combinations thereof. The antifouling compound can also include organic salts, bromine, ozone, phenols, copper sulphate, polyquat, zinc compounds, chlorine compounds, sodium hypochlorite, or combinations thereof.

The antifouling agent can also include various additives such as water or other solvents, surfactants, thickeners, perfumes, or the like for modifying certain properties of the antifouling compound as desired for a particular application.

The antifouling compound can include phosphoric acid. The phosphoric acid can be included in the antifouling compound in a substantially pure form, as an aqueous solution of about 85% concentration of phosphoric acid in water, or in other forms or concentrations. In one aspect, the antifouling agent includes about 2-30%, about 5-20%, or about 10-15% of phosphoric acid. The amount of phosphoric acid in the nuisance marine growth preventing compound may range from about 0.1-25%, about 0.25-10%, or about 0.5-5%. Furthermore, the antifouling agent may be provided so that nuisance marine growth has a solubility of more than about 0.1 g/100 mL at 20° C. therein.

Suitable antifouling agents are available, such as for example, Barnacle Buster or Barnacle Concentrate available from TRAC Ecological Of America Inc., 3402 SW 26$^{th}$ Ter Ste 11, Fort Lauderdale, Fla. 33312, United States; Barnacle Buster available from Quality Chemical, 1835 NE 144$^{th}$ St., N. Miami, Fla., 33181, United States; and Starbrite Boat Bottom Cleaner available from Star brite Inc., 4041 SW 47th Avenue, Fort Lauderdale, Fla. 33314, United States. As used herein, a "specified antifouling agent" references "Barnacle Buster," and a "specified antifouling agent concentrate" references "Barnacle Buster Concentrate." The specified antifouling agent and concentrate include the above-noted features of the antifouling agent.

The compound is provided in conjunction with a method and a valve system for preventing/inhibiting marine growth in a valve used to regulate a flow of seawater. The method can produce a valve system that includes a valve and the nuisance marine growth preventing compound. The method includes preparing/providing the nuisance marine growth preventing compound, and introducing the nuisance marine growth preventing compound to an interior of the valve. Generally, the valve may include any type of valve having a selectively operable valve member (e.g. a ball) that regulates the flow of fluid through the valve. In one embodiment, the valve is a ball valve, such as is exemplarily shown in FIGS. 1-5, including a ball for a valve member.

As depicted, a ball valve 10 includes a valve body 20 defining an interior 30 and an exterior 40 of the valve 10. The valve 10 includes a ball 50 located in the interior 30 of the valve 10, for regulating a flow of liquid through the valve 10. The ball 50 includes a bore 51 through which fluid can flow when the ball is in an open position (FIGS. 1-3). When in a closed position (FIGS. 4-5), the ball 50 prevents fluid from flowing through the valve 10.

The valve 10 includes a handle 60 for rotating the ball 50 from the open position (FIGS. 1-3) to a closed position (FIGS. 4-5). The handle 60 is shown in FIGS. 1-3 to be in an open position and in line with a length of the valve body 20. In the illustrated embodiments, rotating the handle 60 about ninety degrees to be perpendicular with the length of the valve body 20 will cause the ball 50 to rotate about ninety degrees from the position shown in FIG. 3, to a closed position shown in FIG. 4. When in the closed position, the bore 51 in the ball 50 is no longer aligned with the length of the valve body 20, but is perpendicular with the length of the valve body 20, thereby preventing the flow of liquid through the valve 10.

An outer surface 52 of the ball 50 is sealed against an inner surface 21 of the valve body 20 with seat rings 70. As can be seen in FIG. 3, there is a space 80 between the outer surface 52 of the ball 50 and the inner surface 21 of the valve body 20 when the valve is in the open position. When the valve 10 is used to regulate a flow of seawater by rotating the ball 50 to the closed position (FIGS. 4-5), the bore 51 is perpendicular with the length of the valve body 20 and open to the space 80. Accordingly, some of the seawater that may be present in the bore 51 of the valve 10 can accumulate in the space 80. The seawater in the space 80 may become stagnant, even when the ball 50 is rotated again to the open position (FIGS. 1-3). The accumulated seawater in the space 80 can result in the growth and accumulation of nuisance marine growth in the interior 30 of the valve 10, particularly in the space 80 where the seawater is stagnant for substantial periods of time.

To address this fouling of the valve 10 due to stagnant seawater accumulated in the space 80, a nuisance marine growth preventing compound 81, which is prepared and provided in the manner described above, is introduced into the space 80. To facilitate the introduction of the nuisance growth preventing compound 81, the valve 10 may include a drain port through which the compound can be introduced to the interior 30 of the valve 10, particularly to the space 80 between the ball 50 and the valve body 20. The drain port may include a grease fitting 90 (also referred to herein as a zerk fitting) that may be used for introducing the compound to the space 80. The grease fitting 90 is selectively operable to open and close the drain port to the interior 30 of the valve 10. A grease gun may be used to inject the compound through the grease fitting 90 and into the interior 30 of the valve 10, between the ball 50 and the valve body 20.

In one aspect, the valve 10 also includes a drain plug 100, which can be opened to allow bleeding of substances from the space 80 to the exterior 40 of the valve 10. For example, the drain plug 100 can be opened as the nuisance marine growth preventing compound is introduced into the space 80 through the grease fitting 90, wherein substances such as air, seawater, or previously contaminated nuisance marine growth preventing compound can be forced from the space 80, through an aperture in the valve body 20, to the exterior 40 of the valve 10 as fresh nuisance marine growth preventing compound fills the space 80. In this way, the quality of the valve 10 is maintained by preventing/inhibiting fouling.

Introducing the nuisance marine growth preventing compound to the space 80 can include a discrete step, a continuous process, several discrete steps performed at various time intervals, or combinations thereof; and the process can be performed manually or in an automated fashion. For example, the nuisance marine growth preventing compound can be introduced to space 80 at discrete times, such as before a first use of the valve 10, including prior to installation of the valve 10 in a conduit system. The nuisance marine growth preventing compound can also be introduced to space 80 in a continuous manner, such as by an automated process during a use of the valve 10 to regulate a flow of seawater.

As the nuisance marine growth preventing compound is introduced into, and fills the space 80 between the ball 50 and the valve body 20, the compound contacts the outer surface 52 of the ball 50. The compound may also contact the inner surface 21 of the valve body 20 and the seat rings 70. In this way, the grease component of the nuisance marine growth preventing compound will lubricate the seal formed by the seat rings 70 between the ball 50 and the body 20. That is, the nuisance marine growth preventing compound lubricates the ball and the seat rings to minimize friction between the ball 50 and the ball seat rings 70 when the valve 10 is moved between open and closed positions.

Furthermore, as shown in FIG. 5, as the ball 50 is moved to the closed position, the bore 52 is opened to the space 80. However, the nuisance marine growth preventing compound 81 will occupy the space 80, thereby preventing seawater that may be present in the bore 51 from entering the space 80 and accumulating therein. In this way, the nuisance marine growth preventing compound inhibits fouling of the valve 10 because seawater is inhibited from filling the space 80. Without stagnant seawater accumulating in space 80, nuisance marine growth is thereby inhibited.

The nuisance marine growth preventing compound also includes the antifouling agent, which is provided to inhibit nuisance marine growth in a scenario where seawater is able to enter the space 80 between the ball 50 and the valve body 20. For example, some of the nuisance marine growth preventing compound that fills space 80 may get washed away by seawater during normal use of the valve 10. As the nuisance marine growth preventing compound is in some measure washed away, seawater may partially fill in the space 80 and accumulate therein. To prevent nuisance marine growth, the nuisance marine growth preventing compound includes an antifouling agent that is capable of dissolving nuisance marine growth that may accumulate. Furthermore, additional and new nuisance marine growth preventing compound can be introduced to completely fill the space 80.

The present subject matter also includes a valve system comprising a valve 10 and the nuisance marine growth preventing compound in the space 80. The nuisance marine growth preventing compound may occupy all or a portion of the space 80 between the ball 50 and the valve body 20.

The methods and systems described herein include the use of an antifouling agent capable of dissolving biofouling and non-living fouling materials, yet not damage the valve 10 itself. More specifically, the antifouling agent is configured to not substantially degrade (such as by chemical reaction) the materials used to make the valve including the ball 50, the body 20, and the seat rings 70. These materials used to make the valve may include various metals, polymers, ceramics, glass, composite materials and combinations thereof.

Furthermore, the fouling material (i.e. nuisance marine growth) has a solubility in the antifouling agent of more than about 0.1 g/100 mL at 20° C. and is thus prevented from accumulating in the space 80 between the ball 50 and the valve body 20. In one embodiment, the materials used to make the valve have a solubility in the antifouling agent of less than about 0.1 g/100 mL at 20° C., and are thus not significantly degraded from contact with the antifouling agent.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

For example, while a ball valve is described above, the method and system are suitable for use with a non-ball valve used to regulate a flow of seawater. Such a valve may include a valve body defining an interior and an exterior of the valve, and a selectively operable valve member (other than a ball) positioned in the interior of the valve to regulate the flow of seawater through the valve body. In such an embodiment, the compound may be provided relative to the valve body and valve member in a manner similar to that for the ball valve embodiment described above.

What is claimed is:

1. A method of lubricating and preventing marine growth in a valve used to regulate a flow of seawater, the valve comprising a valve body defining an interior and an exterior of the valve, a ball positioned in the interior of the valve to regulate the flow of seawater through the valve body, and a drain port between the interior and the exterior of the valve, the method comprising:
providing a compound including a mixture of a marine grease and an antifouling agent, wherein the compound is provided to include the antifouling agent in which nuisance marine growth has a solubility of more than about 0.1 g/100 mL at 20° C., and
introducing the compound to the interior of the valve through the drain port such that the compound is provided between and contacts the ball and the valve body.

2. The method of claim 1, wherein the compound is provided to include the marine grease and the antifouling agent at a volumetric ratio of about 5:1.

3. The method of claim 1, wherein the compound is provided with the antifouling agent including about 2-30% phosphoric acid.

4. The method of claim 1, wherein prior to introducing the compound to the interior of the valve, seawater is disposed in a space near the ball, and the compound displaces said seawater while being introduced to the interior of the valve.

5. The method of claim 1, wherein:
the valve is a ball valve in which ball seat rings provide a seal against an outside surface of the ball, and
the compound is introduced to the interior of the valve to contact at least a portion of the ball, at least a portion of the ball seat rings, and the valve body at a position adjacent to the ball and ball seat rings, so as to lubricate contact between the ball and the ball seat rings and inhibit seawater from occupying a space between the ball, the ball seat rings, and the valve body at which the compound is provided.

6. The method of claim 1, wherein the compound is introduced to the interior of the valve to cover at least a portion of an outer surface of the ball and to contact the valve body at a position adjacent to the ball, so as to lubricate a regulating operation of the ball and to inhibit seawater from occupying a space between the ball and the valve body at which the compound is provided.

7. The method of claim 1, wherein the drain port includes a zerk fitting, and the compound is introduced to the interior of the valve through the zerk fitting.

8. A valve system for regulating the flow of seawater, comprising:
a valve including a valve body defining an interior and an exterior of the valve, and a ball positioned in the interior of the valve and configured to regulate a flow of seawater through the valve body, and
a compound provided in the interior of the valve between and in contact with the ball and the valve body, the compound comprising a substantially uniform mixture of marine grease and an antifouling agent,
wherein the compound prevents the seawater from entering an area between the ball and the valve body at which the compound is provided, and nuisance marine growth has a solubility in the antifouling agent of more than about 0.1 g/100 mL at 20° C.

9. The system of claim 8, wherein the antifouling agent includes about 2-30% phosphoric acid.

10. The system of claim 8, wherein the antifouling agent comprises about 5-20% of an aqueous solution of about 85% phosphoric acid.

11. The system of claim 8, wherein:
the valve comprises a ball valve including the ball, and ball seat rings that provide a seal against an outside surface of the ball, and
the compound lubricates the ball to minimize friction between the ball and the ball seat rings.

12. The system of claim 8, wherein the valve includes a zerk fitting selectively operable to open and close a drain port that communicates between the exterior and the interior of the valve, the zerk fitting configured to allow the compound to be introduced to the interior of the valve between the ball valve and the valve body.

13. A valve system for regulating the flow of seawater, comprising:
a valve including a valve body defining an interior and an exterior of the valve, and a ball positioned in the interior of the valve and configured to regulate a flow of seawater through the valve body, and
a compound provided in the interior of the valve between and in contact with the ball and the valve body, the compound comprising a substantially uniform mixture of marine grease and an antifouling agent,
wherein the compound prevents the seawater from entering an area between the ball and the valve body at which the compound is provided, and the compound includes the marine grease and the antifouling agent at a volumetric ratio of about 5:1.

14. The system of claim 13, wherein the antifouling agent includes about 2-30% phosphoric acid.

15. The system of claim 13, wherein the antifouling agent comprises about 5-20% of an aqueous solution of about 85% phosphoric acid.

16. The system of claim 13, wherein:
the valve comprises a ball valve including the ball, and ball seat rings that provide a seal against an outside surface of the ball, and
the compound lubricates the ball to minimize friction between the ball and the ball seat rings.

17. The system of claim 13, wherein the valve includes a zerk fitting selectively operable to open and close a drain port that communicates between the exterior and the interior of the valve, the zerk fitting configured to allow the compound to be introduced to the interior of the valve between the ball valve and the valve body.

* * * * *